US011234447B2

(12) United States Patent
Mora et al.

(10) Patent No.: US 11,234,447 B2
(45) Date of Patent: Feb. 1, 2022

(54) ROAST AND GROUND COFFEE POWDER AND METHODS OF MAKING THEREOF

(71) Applicant: NESTEC S.A., Vevey (CH)

(72) Inventors: Federico Mora, Morges (CH); Murray Joshua, Chester (GB); Lennart Fries, Belmont-sur-Lausanne (CH); Gerhard Niederreiter, Vevey (CH); Stefan Palzer, Lausanne (CH); Deepak Sahai, Plain City, OH (US)

(73) Assignee: Societe des Produits Nestle S.A., Vevey (CH)

( * ) Notice: Subject to any disclaimer, the term of this patent is extended or adjusted under 35 U.S.C. 154(b) by 256 days.

(21) Appl. No.: 16/462,297

(22) PCT Filed: Dec. 22, 2017

(86) PCT No.: PCT/EP2017/084311
§ 371 (c)(1),
(2) Date: May 20, 2019

(87) PCT Pub. No.: WO2018/115402
PCT Pub. Date: Jun. 28, 2018

(65) Prior Publication Data
US 2019/0274329 A1    Sep. 12, 2019

Related U.S. Application Data

(60) Provisional application No. 62/438,607, filed on Dec. 23, 2016.

(51) Int. Cl.
*A23F 5/26* (2006.01)
*A23F 5/40* (2006.01)

(52) U.S. Cl.
CPC ............... *A23F 5/26* (2013.01); *A23F 5/40* (2013.01); *A23F 5/405* (2013.01)

(58) Field of Classification Search
CPC ............ A61K 9/0095; A61K 2236/331; A23V 2250/2108; A23F 5/26; A23F 5/32; A23F 5/262; A23F 5/28; A23F 5/24; A23F 5/483; A23F 5/10; A23F 5/40; A23F 5/405
See application file for complete search history.

(56) References Cited

U.S. PATENT DOCUMENTS

| 2,110,732 | A | | 3/1938 | Kane |
| 2,599,682 | A | | 6/1952 | Wirtel et al. |
| 3,682,649 | A | * | 8/1972 | Orozovich ............... A23F 5/26 426/390 |

(Continued)

FOREIGN PATENT DOCUMENTS

GB    2496265    5/2013

OTHER PUBLICATIONS

Russia Patent Office Action Received for Application No. RU2019115950, dated Mar. 24, 2021, 15 pages.

*Primary Examiner* — Hong T Yoo
(74) *Attorney, Agent, or Firm* — K&L Gates LLP

(57) ABSTRACT

The present invention relates to a dried roast and ground coffee product allowing to prepare a cold brew coffee beverage in 5 minutes without compromising on the flavour. The present invention also relates to methods for making said dried roast and ground coffee product. Finally, use of said dried roast and ground coffee product are provided.

7 Claims, 1 Drawing Sheet

(56) References Cited

U.S. PATENT DOCUMENTS

| | | | | |
|---|---|---|---|---|
| 3,997,685 | A | * | 12/1976 | Strobel .................. A23F 3/426 426/594 |
| 2003/0026883 | A1 | | 2/2003 | Bunke et al. |
| 2006/0230944 | A1 | | 10/2006 | Neace, Jr. et al. |
| 2014/0178559 | A1 | | 6/2014 | Neace, Jr. |
| 2016/0362246 | A1 | | 12/2016 | Garcin et al. |

* cited by examiner

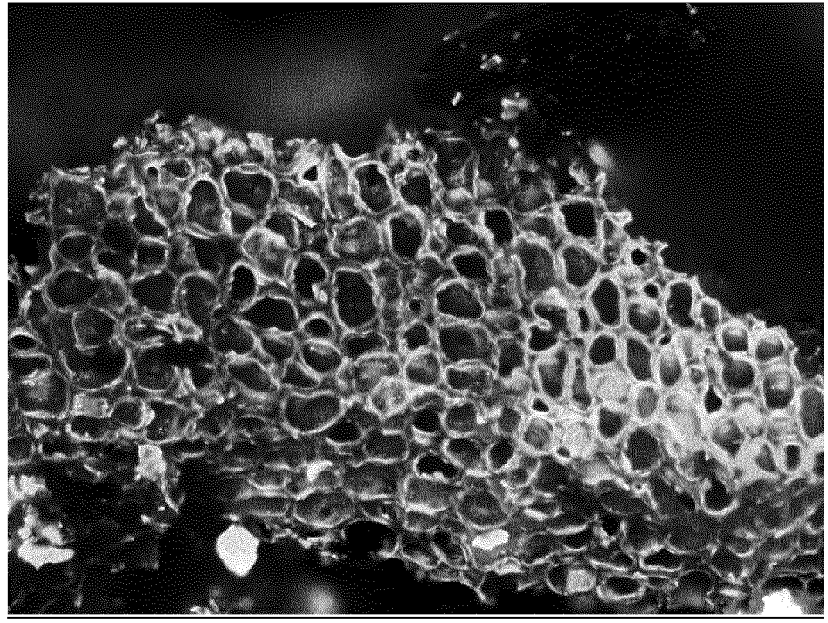
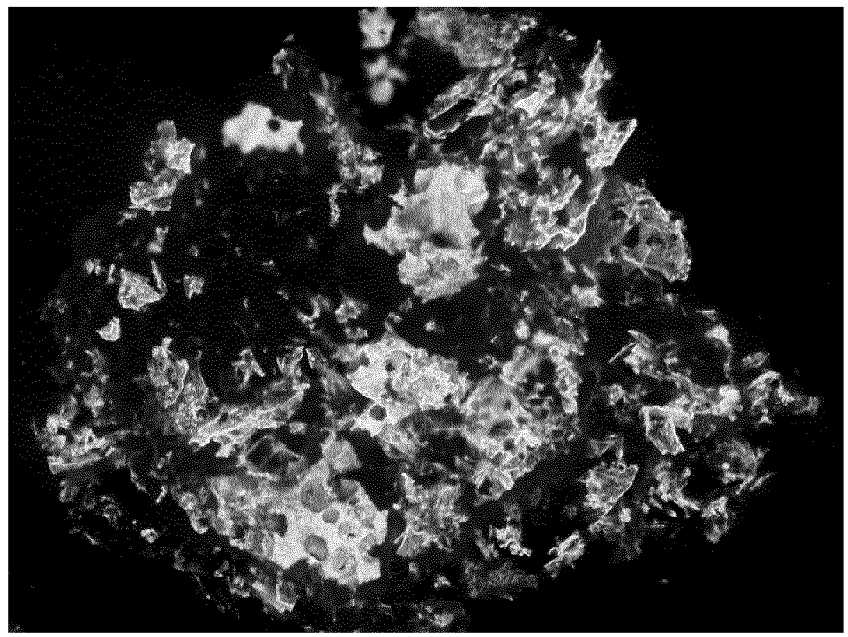

ROAST AND GROUND COFFEE POWDER AND METHODS OF MAKING THEREOF

CROSS REFERENCE TO RELATED APPLICATIONS

The present application is a National Stage of International Application No. PCT/EP2017/084311, filed on Dec. 22, 2017, which claims priority to U.S. Provisional Patent Application No. 62/438,607, filed on Dec. 23, 2016, the entire contents of which are being incorporated herein by reference.

FIELD OF THE INVENTION

The present invention relates to a roast and ground coffee product for preparation of cold brew coffee beverage and to the methods of making said roast and ground coffee powder.

BACKGROUND OF THE INVENTION

Any discussion of the prior art throughout the specification should in no way be considered as an admission that such prior art is widely known or forms part of common general knowledge in the field.

Coffee beverage is traditionally made by brewing roast and ground coffee beans with hot water. Brewing roast and grounds coffee beans with cold water has become a popular way to prepare coffee drinks, notably because cold brew coffee taste is smoother (less acidic and less bitter) than taste of hot brewed coffee and so cold brew coffee is better for people having stomach problems. So called "cold brew coffee" refers to a coffee beverage prepared by steeping ground coffee in water at room-temperature or below (typically between 4° C. to 30° C.) for an extended period of time (typically 12 to 24 hours). Generally, a coarser grind size is adopted in cold brewing as an increased contact time is required between the coffee and the water to generate the desired flavour. Additionally, the longer the ground coffee beans are steeped in cold water the stronger the flavour of the coffee beverage; steeping for 12 to 16 hours is generally considered the optimum for creating a flavourful and deep coffee extract. However, coffee aromas can be degraded during the long steeping time needed to prepare cold brew coffee. Final preparation step consists in filtering the coffee grounds out of the water using a paper coffee filter, a fine metal sieve, a French press or felt, in the case of "Toddy" brewing system. Depending on the coffee to water used to prepare the cold brew coffee, the beverage can be consumed as such or diluted for consumption thereafter.

The use of cold or room temperature water to prepare cold brew coffee avoids undesirable oxidation and extraction of oils and acids contained in the coffee that are soluble only at high temperature and that are responsible for the bitter and acidic taste associated with coffee. Therefore, cold brew coffee is usually less acidic and less bitter than coffee prepared by hot brewing. On the other hand, cold brew coffee may have a decreased coffee flavour due to the degradation of coffee aromas during the long preparation time required and/or to the extraction slower kinetics in cold or room temperature water.

There are variety of well-known techniques and coffee makers used for small scale manufacture of cold brew, including the Kyoto® cold brew method, the Mason jar, French press, the Cold Brew Toddy® and Bucket brewing. These coffee makers are usually composed a reservoir, which can be for example made of plastic, containing a filter, the reservoir being placed on top of a pot used for collecting the beverage. Roast and ground coffee is placed in the reservoir together with water. Usually, the quantity of roast and ground coffee typically used to obtain a flavourful cold brew coffee is greater than the quantity of roast and ground coffee typically used to brew drip coffee for example. The mixture is then let steeped for between 8 and 24 hours, either at room temperature or at 4° C., and thereafter filtered to recover the cold brew coffee beverage. Each of the traditional methods for preparing cold brew coffee beverage require an extended preparation time which is perceived as too long for consumers. Additionally, the use of coffee makers can result in inconsistent quality of the cold brew coffee regarding the flavour intensity.

There is therefore a need to have more rapid ways for the consumer to prepare cold brew coffee beverage, allowing to have a cold brew coffee beverage consistently rich in typical cold brew coffee flavour.

Industrial scale processes are currently following the same principles of steeping roast and ground coffee beans for an extended period of time in water at room temperature or below, usually in stainless steel tanks equipped with filters. Therefore, production of cold brew at industrial scale is also time consuming.

WO2011/002750 describes a beverage brewing method where the mixture of coffee grounds with water is brewed into a chamber under vacuum and thereafter filtrated to recover the beverage. This method allows to quickly brew coffee, but, although this document mentions that vacuum extraction could be performed with cold water, it clearly states that the extraction is not fully achieved when using cold water, resulting in an underdeveloped flavour or beverage.

WO20137019676 describes a method of producing a cold-brewed instant coffee comprising the steps of preparing a slurry by mixing water having a temperature of less than 47° C. to ground coffee beans, maintaining the slurry at a temperature below 47° C. for at least an hour, separating the liquid extract from the solid components and drying the liquid extract to obtain a solid coffee extract that can be used as instant coffee. The coffee beverage obtained upon reconstitution with water shows less acidity and bitterness, typical of cold-brewed coffee. However, the stability of this instant coffee is rather low as it is hygroscopic and can absorb moisture rather quickly. There is therefore a need to have a product for preparing a cold brew coffee that is easy and quick to prepare and is as well shelf-stable.

It is an object of the present invention to provide a shelf-stable dried roast and ground coffee product for preparing a cold brew coffee beverage in a fast and simple way for the consumer, while keeping the typical flavour of cold brew coffee. It is also an object of the present invention to provide methods to manufacture such a dried roast and ground coffee powder for preparing a cold brew coffee. Finally, it is an object of the present invention to provide use of said dried roast and ground coffee product.

SUMMARY OF THE INVENTION

The present invention provides a dried roast and ground coffee product allowing to prepare a cold brew coffee beverage in 5 minutes or even less, without compromising on the flavor, instead of the 12 to 24 hours required by the traditional ways of preparing cold brew coffee beverage.

Accordingly, the present invention provides a dried roast and ground coffee product, wherein roast and ground coffee particles are infused and/or coated with at least 10 weight % of soluble coffee solids and wherein said soluble coffee solids have been extracted at a temperature below 60° C.

Another aspect of the invention provides a process for manufacturing a dried roast and ground coffee powder according to the invention comprising the steps of:
- a) extracting roast and ground coffee beans at a temperature below 60° C.;
- b) cooling the coffee extract of step a) to a temperature between 10° C. and 4° C.;
- c) mixing the cooled coffee extract of step b) with roast and ground coffee that was not extracted in step a) in a ratio of soluble coffee solids to roast and ground coffee between 1:1 and 1:10, thereby infusing and/or coating the roast and ground coffee particles with soluble coffee solids; and
- d) drying the infused and/or coated roast and ground coffee of step c).

In a third aspect, the invention provides a process for manufacturing a dried roast and ground coffee product according the invention comprising the steps of:
- a) mixing roast and ground coffee with water at temperature below 60° C., in a ratio of roast and ground coffee to water between 1:1 and 1:5, thereby obtaining a slurry;
- b) extracting roast and ground coffee of the slurry in a vacuum chamber, by applying a pressure between 75 mbar and 400 mbar for between 1 and 12 minutes at temperature between 10° C. and 35° C.; and
- c) drying the slurry of step b).

In a fourth aspect, the invention provides method of preparing a beverage, the method comprising the steps of mixing the dried roast and ground coffee product according to the present invention with a liquid, preferably water, at temperature below 35° C., with a ratio of dried roast and ground coffee product to water between 1:5 and 1:20, allowing the mixture to steep for less than 5 minutes and filtering the mixture to recover the beverage.

In another object, the present invention to provide a beverage coffee capsule comprising the dried roast and ground coffee product of the present invention.

In yet another object, the present invention provides a method for preparing a beverage in a beverage dispenser, said beverage dispenser comprising at least one container storing the dried roast and ground coffee product of the present invention, said method comprising the steps of dosing a dose of the dried roast and ground coffee product from the container and mixing with liquid, preferably water, at a temperature below 35° C.

BRIEF DESCRIPTION OF THE FIGURES

The present invention is further described hereinafter with reference to some of its embodiments shown in the accompanying drawings in which:

FIG. 1 shows the structure of a roast and ground coffee product according to the present invention after vacuum extraction (bottom picture) compared to the structure of roast and ground coffee that was not extracted (top picture).

DETAILED DESCRIPTION OF SOME EMBODIMENTS OF THE INVENTION

In this specification, the following terms or expression are given a definition that must be taken into account when reading and interpreting the description, examples and claims.

The expression "ambient temperature" as to be understood as the typical indoor temperature to which people are generally accustomed. In the scientific and technical context, the ambient temperature is commonly acknowledged to be 20° C.

The expression "soluble coffee solids" comprises all solids contained within the coffee matrix that are extractable with water. These includes, but is not limited to, chlorogenic acids and their respective lactones, remaining free sugars and amino acids, coffee alkaloids such as trigonelline and caffeine, organic acids, inorganic acids and salts. Soluble coffee solids contribute to the flavour of coffee beverage.

All percentages are by weight unless otherwise stated. The expression "weight %" and "wt %" are synonymous. They refer to quantities expressed in percent on a dry weight basis.

It is noted that the various aspects, features, examples and embodiments described in the present application may be compatible and/or combined together.

As used in the specification, the words "comprises", "comprising" are not to be interpreted in an exclusive or exhaustive sense. In other words, they are intended to mean "including, but not limited to".

Extraction at high temperature (between 90° C. and 95° C.) is commonly accepted as ideal to generate the optimum coffee flavour. Extraction with cold water is known to results in a typical flavour that is less acid and less bitter than the flavour of drip brew coffee. This is mostly due to the fact that oils and acids responsible for the acidity and bitterness are soluble only at high temperature and therefore are not extracted during cold extraction. Although this typical flavour profile is appreciated by cold brew coffee consumers, it may be perceived as "flat" and as missing the full body flavour of hot brewed coffee. Soluble coffee solids, which contribute to the coffee flavour, have markedly decreased solubility in water at room temperature or below. Therefore, when brewing ground coffee at low temperatures, such as at room temperature or below, to prepare a cold brew coffee beverage, the extraction time has to be significantly expanded, to maximize extraction of the soluble coffee solids from the grounds.

A first object of the present invention provides a dried roast and ground coffee product comprising roast and ground coffee particles that are infused and/or coated with at least 10 wt % of soluble coffee solids and wherein the soluble coffee solids have been extracted at a temperature below 60° C.

In one embodiment, the soluble coffee solids have been extracted at a temperature below 55° C., or below 50° C., or below 45° C., or below 40° C., or below 35° C., or below 30° C., or below 25° C. or below 20° C. In yet another embodiment, the soluble coffee solids have been extracted at a temperature between 60° C. and 20° C., or at a temperature between 50° C. and 20° C., or at a temperature between 40° C. and 20° C. or at a temperature between 30° C. and 20° C. In still another embodiment, the soluble coffee solids have been extracted at room temperature or below.

The roast and ground coffee product according to the present invention is particularly convenient to prepare a cold brew coffee beverage as the time required to prepare the cold brew coffee beverage is less than 5 minutes, instead brewing traditional roast and ground coffee beans for several hours.

The present invention provides a dried roast and ground product allowing to produce a cold brew coffee beverage with a reduced brewing time as compared to the traditional way of preparation of cold brew coffee beverage, without compromising on the overall flavour of the cold brew coffee beverage. To this end, the dried roast and ground coffee product according to the present invention comprises roast and ground particles that are infused and/or coated with at least 10 wt % of soluble coffee solids that were extracted with water at low temperature, namely at temperature below 60° C. By infusion and/or coating, it is meant that the soluble coffee solids that were extracted at low temperature and mixed with roast and ground coffee are absorbed by roast and ground coffee particles, resulting in an increased extraction yield after brewing in a liquid having a temperature between 4° C. and 35° C. after only few minutes. Indeed, the inventors have found that the extraction yield of the roast and ground product according to the present invention is already of about 25 wt % after 1 minute of brewing in a liquid at room temperature. Extraction of the coffee solids from roast and ground coffee beans at such low temperature is commonly designated as "cold brewing" and allows preserving the low acidity and bitterness flavour. An additional advantage of the roast and ground coffee powder of the present invention is that it develops a more intense, dark coffee-like flavour when brewed in a liquid at temperature below 30° C.

The roast and ground coffee particles of the claimed invention are infused and/or coated with at least 10 weight % of soluble coffee solids. In one embodiment, the roast and ground particles are infused/and or coated with between 10 wt % and 50 wt % of soluble coffee solids, or between 15 wt % and 50 wt % of soluble coffee solids, or between 20 wt % and 50 wt % of soluble coffee solids. In yet another embodiment, the roast and ground particles are infused/and or coated with between 15 wt % and 40 wt % of soluble coffee solids or between 20 wt % and 40 wt % of soluble coffee solids.

In one embodiment, 90% of the soluble coffee solids infusing and/or coating the roast and ground coffee particles of the present invention are recovered in the cold brew coffee beverage when brewing for 5 minutes in water at temperature of 20° C. This has then the advantage that the brewing time to prepare a cold brew coffee beverage with the dried roast and ground coffee powder of the present invention is decrease as compared to the traditional way of preparing cold brew coffee beverage starting from traditional roast and ground coffee.

In one embodiment, the dried roast and ground coffee product according to the present invention can be blended, i.e. mixed, with other coffee products, such as with roast and ground coffee beans that were not infused and/or coated with soluble coffee solids, or with spent ground coffee, also known as exhausted coffee, which is roast and ground coffee residue resulting from the production coffee beverage or soluble coffee, and/or with micronized roasted coffee. Blending the dried roast and ground coffee product of the present invention with other coffee products can result for example, in increased coffee flavour in the beverage obtained after brewing or may improve shelf stability of the blended product.

In one embodiment of the present invention, the extraction yield of the roast and ground coffee product according to the present invention is between 15 wt % and 50 wt % after brewing said roast and ground coffee product for 5 minutes in a liquid, for example in water, at temperature of 20° C. In comparison, the extraction yield that can be achieved by extracting regular roast and ground coffee beans extracted with water at 20° C. for less 5 minutes is about 15 wt % or less (see Table 1). The extraction yield is the percentage of soluble coffee solids extracted from the dry coffee and dictates the flavour profile of the cup. Only about 30 wt % of dry, ground coffee is water soluble, the remainder generally being water insoluble materials such as cellulose and oil. It is commonly accepted that best flavour and taste is achieved at between 18 wt % to 20 wt % extraction. The factors affecting the extraction yield, and therefore the flavour profile, are the ground coffee particle size (surface area), the coffee/water contact time and the agitation. All these factors have an impact on the amount of soluble coffee solids that will dissolve in the brew water. Brewing in water at temperature of 20° C. of the roast and ground coffee powder according to the present invention surprisingly results in an extraction yield between 15 wt % and 50 wt %, therefore providing optimal coffee flavour despite the very short brewing time (i.e. short coffee/water contact time) of 5 minutes.

In one embodiment, the extraction yield is between 15% and 50% after brewing for 4.5 minutes, or for 4 minutes, or for 3.5 minutes, or for 3 minutes, or for 2.5 minutes in a liquid at 20° C.

In yet another embodiment of the present invention, the extraction yield is between 15 wt % and 45% wt when brewing for 5 minutes in a liquid at temperature of 20° C., or between 15 wt % and 40 wt %, or between 15 wt % and 35 wt %, or between 15 wt % and 30 wt %, or between 15 wt % and 25 wt %. In another embodiment, the extraction yield is between 20 wt % and 50 wt %, or between 25 wt % and 50 wt %, or between 30 wt % and 50 w %.

TDS (Total Dissolved Solids) can also be used to measure extraction of coffee beans and TDS relates to the percentage of coffee solids in the cup, meaning the strength of the coffee/water mixture or in other words the strength of the flavour. Typical figures are about 1.5% for filter coffee and 15% for expresso. TDS can be measured directly using a portable coffee refractometer. The factor affecting TDS, and therefore affecting the strength of flavour, are the dose of dry, ground coffee used and the volume of water in cup.

In one embodiment, the dried roast and ground coffee product for preparing a cold brew coffee comprises at least 10 wt % of soluble coffee solids infusing and/or coating roast and ground coffee particles, wherein the extraction yield of said dried roast and ground coffee powder is between 10 wt % to 50 wt % when brewing for 5 minutes in a liquid at 20° C.

For the avoidance of doubt, the dried roast and ground product of the present invention is not soluble. In one embodiment, the roast and ground particles have a have a size between 400 μm and 1.2 mm. The particle size can be adapted to the way of preparation of the cold brew beverage and to the desired extraction yield.

The roast and ground coffee is obtained by a heat treatment well known in the art, i.e. roasting, of green coffee beans followed by milling of the beans. The roast and ground coffee beans can be of any variety, for example *Arabica* or *Robusta* origin.

A second object of the present invention provides a process for manufacturing a dried roast and ground coffee product according the present invention comprising the steps of:
  a) extracting roast and ground coffee beans at a temperature below 60° C.;
  b) cooling the extract of step a) to a temperature between 10° C. and 4° C.;
  c) mixing the extract obtained in step b) with roast and ground coffee that was not extracted in step a) in a ratio of soluble coffee solids to roast and ground coffee between 1:1 and 1:10, thereby infusing and/or coating the roast and ground coffee particles with soluble coffee solids; and d) drying the infused and/or coated roast and ground coffee of step c).

Extraction of roast and ground coffee beans is very well known in the art and can be achieved by any suitable method, such as extraction methods described in EP 0 826 308 or in EP 0 916 267. Extraction can therefore be performed in extraction cells or any other extraction equipment. Extraction can be performed in any suitable aqueous liquid, for example water or water based coffee extract.

During extraction, the soluble coffee solids are extracted from the roast and ground coffee matrix and, when mixed with roast and ground coffee that was not extracted, these soluble coffee solids infuse and/or coat the surface of the roast and ground particles. This has the effect that soluble coffee solids are readily accessible to water during brewing, contrary to regular grinded coffee beans where the soluble coffee solids is embedded in the roast and ground coffee matrix, thereby allowing an increased extraction yield in a very short brewing time.

The extraction in step a) is performed at a temperature below 60° C. This advantageously results in a less acidic and less bitter flavour, and therefore in a smooth flavour, which is characteristic of cold brew coffee beverage and is particularly appreciated by the consumers. In another embodiment, the extraction of step a) can be performed at a temperature of below 55° C., or below 50° C., or below 45° C., or below 40° C., or below 35° C., or below 30° C., or below 25° C. or below 20° C. In yet another embodiment, the extraction of step a) is performed at a temperature between 60° C. and 20° C., or between 55° C. and 20° C., or between 50° C. and 20° C., or between 45° C. and 20° C., or between 40° C. and 20° C., or between 35° C. and 20° C., or between 30° C. and 20° C. In still another embodiment, the extraction of step a) is performed at room temperature or below.

The coffee extract obtained in step a) is then cooled to a temperature between 10° C. and 4° C. This cooling step has mainly the effect of increasing the viscosity of the extract, thereby improving the subsequent infusing and/or coating of the roast and ground coffee particles with soluble coffee solids. In one embodiment, the extract is cooled to a temperature between 9° C. and 4° C., or between 8° C. and 4° C., or between 7° C. and 4° C., or between 6° C. and 4° C. In yet another embodiment, the extract is cooled to a temperature between 10° C. and 5° C., or between 10° C. and 6° C., or between 10° C. and 7° C.

The cooled coffee extract of step b) is mixed with roast and ground coffee that was not extracted in a ratio of soluble coffee solids to roast and ground coffee between 1:1 and 1:10, thereby infusing and/or coating the non-extracted roast and ground coffee particles with soluble coffee solids, meaning that the soluble coffee solids are absorbed by the roast and ground beans, therefore being readily accessible to water during brewing, contrary to regular grinded coffee beans where the soluble coffee solids is embedded in the roast and ground coffee matrix. The inventors have found that 1.2 to 2 times more coffee solids are released when brewing the roast and ground coffee product according to the present invention in a liquid at a temperature of 20° C. for 5 minutes, as compared to traditional roast and ground coffee when brewing in cold water. As a consequence, the extraction yield of the dried coffee product according to the present invention is increased, as well as the TDS. This has the particular advantage of significantly decreasing the amount of time needed to obtain a cold brew coffee beverage without compromising on the flavour, as a cold brew coffee beverage can be prepared in a few minutes instead of in at least 12 hours.

The cooled coffee extract obtained in step a) can be either directly cooled and then mixed with not extracted roast and ground coffee beans, or alternatively, it can be concentrated, for example by vacuum evaporation, to a TC (i.e. a total content of solids) between 4 wt % and 55 wt % before the cooling step. In one embodiment, the coffee extract of step a) is concentrated to a TC between 4 wt % and 50 wt %, or to a TC between 4 wt % and 45 wt %, or to a TC between 4 wt % and 40 wt %, or to a TC between 4 wt % and 35 wt % or to a TC between 4 wt % and 30 wt %. The concentration of the extract has the effect of improving the infusion and/or coating of the roast and ground coffee particles.

In one embodiment, the coffee extract of step b) is mixed with spent ground coffee. Spent ground coffee infused and/or coated with soluble coffee solids may improve the shelf-stability of the dried roast and ground coffee product according to the present invention.

A third object of the present invention provides a process for manufacturing the dried roast and ground coffee product according the present invention comprising the steps of:

a) mixing roast and ground coffee with water at temperature below 60° C., in a ratio of roast and ground coffee to water between 1:1 and 1:5, thereby obtaining a slurry;

b) extracting roast and ground coffee of the slurry in a vacuum chamber, by applying a pressure between 75 mbar and 400 mbar for between 1 and 12 minutes at temperature between 10° C. and 35° C.; and c) drying the slurry of step b).

Roast and ground coffee is mixed in step a) with water at a temperature below 60° C. In one embodiment, the roast and ground coffee is mixed with water at a temperature of below 55° C., or below 50° C., or below 45° C., or below 40° C., or below 35° C., or below 30° C., or below 25° C. or below 20° C. In yet another embodiment, the roast and ground coffee is mixed with water at a temperature between 30° C. and 20° C. In still another embodiment, the roast and ground coffee is mixed with water at room temperature or below.

The extraction step b) can be performed in a vacuum chamber or in any suitable closed vessel. The application of vacuum during extraction allows boiling of the slurry at lower temperature whilst also drawing the surrounding liquid into the pores of the roasted grounds. These two phenomena result into infusion and/or coating of the coffee particles allowing a significantly shorter brewing time to obtain a cold brew coffee beverage by brewing the roast and ground coffee product of the present invention, i.e. a few minutes, as compared to several hours required by traditional cold brewing to obtain the same TDS, whilst having an intense and smooth flavour. Moreover, during vacuum extraction, the internal structure of the roast and ground coffee particles can be significantly transformed to a structure with less closed pores and more open pores and void spaces, thereby increasing the surface area that can contact water during brewing (see FIG. 1, bottom picture). This can have the effect of further improving the extraction yield of the dried coffee product according to the present invention, as well as the TDS, therefore positively impacting the flavour of the cold brew coffee beverage.

In one embodiment, the extraction of step b) is performed by applying a pressure between 75 mbar and 400 mbar for between 1 and 10 minutes, or for between 1 and 5 minutes.

In another embodiment, the pressure is applied for between 5 and 12 minutes or for between 5 and 10 minutes.

In one embodiment, the extraction of roast and ground coffee in the slurry is performed in a vacuum chamber, by applying a pressure between 75 mbar and 400 mbar for between 1 and 12 minutes at a temperature below 60° C.

In another embodiment, the extraction of roast and ground coffee in the slurry is performed in a vacuum chamber, by applying a pressure between 75 mbar and 400 mbar for between 1 and 5 minutes at a temperature below 60° C.

The amount of water used for vacuum extraction has been found to have an impact on the extraction yield. Indeed, having more water allows increasing the extraction yield. Therefore, in one embodiment, roast and ground coffee is mixed with water in a ratio coffee:water between 1:1 and 1:3.

Drying of the infused and/or coated roast and ground coffee can be performed by any suitable method ensuring the properties of the dried roast and ground coffee product. Suitable drying methods include freeze-drying, spray-drying and vacuum belt drying.

A fourth object of the present invention provides a method of preparing a beverage, the method comprising the steps of mixing the dried roast and ground coffee product according to the present invention with a liquid, preferably water, at temperature below 35° C., with a ratio of roast and ground coffee product to water between 1:5 and 1:20, allowing the mixture to steep for less than 5 minutes and filtering the mixture to recover the beverage. This method has the advantage that the consumer can prepare a cold brew coffee beverage in a few step and with a brewing time significantly shorter as compared to the traditional way of preparing a cold brew coffee beverage.

In a preferred embodiment, the method of preparing a beverage comprises the step of mixing the dried roast and ground coffee product according to the present invention with a liquid, preferably water, at temperature between 35° C. and 4° C., with a ratio of roast and ground coffee product to water between 1:5 and 1:20, allowing the mixture to steep for 5 minutes and filtering the mixture to recover the beverage.

In one embodiment, the dried roast and ground coffee product of the present invention provides a TDS of more than 2 wt % after brewing in a liquid at 20° C. Due to the short brewing time at low temperature, the obtained TDS is surprisingly high and has the advantage of improving the strength of the flavour of the cold brew coffee.

The dried roast and ground coffee product of the present invention is preferably brewed in a liquid, preferably water, at a temperature of 20° C. In one embodiment, the temperature of the liquid used for brewing the dried roast and ground coffee product of the present invention has a temperature comprised between 4° C. and 20° C., or between 4° C. and 15° C., or between 4° C. and 10° C.

It is another object of the present invention to provide a beverage coffee capsule comprising the dried roast and ground coffee product of the present invention. With an extraction yield between 15 wt % and 50 wt % in a liquid of 20° C. after 5 minutes or less, the dried roast and ground coffee product of the present invention allows to prepare a cold brew coffee beverage with a system using capsule, such as Nescafe Dolce Gusto™ system.

It is yet another object of the present invention to provide a method for preparing a beverage in a beverage dispenser, said beverage dispenser comprising at least one container storing the dried roast and ground coffee product of the present invention, said method comprising the steps of dosing a dose of the roast and ground coffee product from the container and mixing with liquid, preferably water, at a temperature below 35° C.

The invention is further described with reference to the following examples. It will be appreciated that the invention as claimed is not intended to be limited in any way by these examples.

Example 1 Preparation of Dried Roast and Ground Coffee Product and of Cold Brew Coffee Beverage a) To prepare the dried roast and ground coffee product, fresh roast and ground coffee beans (mixed with water in a ratio coffee:water of 1:4) were extracted in a coffee extraction cell using water at room temperature to obtain an extract. The extraction yield was of 14 wt %. The extract was then concentrated by vacuum evaporation to a total solid content (TC) of 30 wt %. To infuse and/or coat the roast and ground coffee with soluble coffee solids, the concentrated extract that has been cooled to 4° C. was mixed with spent roast and ground coffee that was also cooled at 4° C., such that the ratio of the weight of soluble coffee solids to spent roast and ground coffee was of 1:2. The mixture was freeze-dried. The dried cake was thereafter ground to a uniform particle size of 850 μm.

To prepare a cold brew coffee beverage, 20 g of the dried roast and ground coffee product according to the present invention were gently dispersed in 500 ml of ice cold water and allowed to steep for 3 minutes. The slurry was filtered through a paper coffee filter in a drip brew coffee maker. A highly flavoured cold brew coffee beverage with a soluble coffee solids content of 1.5 wt % was prepared in less than 5 minutes using the dried roast and ground coffee product according to the present invention.

b) To prepare the dried roast and ground coffee product, fresh roast and ground coffee beans were mixed with water at room temperature in ratios coffee:water of 1:3 (Sample 2) or 1:2.4 (Sample 1) to make a slurry. The slurry was then placed in a vacuum chamber and subjected to a pressure of 300 mbar for 2 minutes. The vacuum was broken and the slurry was immediately freez-dried.

To prepare a cold brew coffee beverage, 5 g or 10 g of either traditional roast and ground coffee (Reference) or 5 g or 10 g of Sample 1 or Sample 2 were placed on a pre-wetted filter paper on a drip coffee maker, pre-wetted with 10 ml of water at 20° C., and then brewed with 90 ml of water at 20° C. directly on the paper filter, for a total brewing time of 5 minutes The cold brew coffee beverage resulted in TC of 3 wt % (ratio 1:3) and of 2.8 wt % (ratio 1:2.4), respectively. The extraction yield Samples 1 and 2 were found to be significantly increased under the above described brewing conditions as compared to the extraction yield of the traditional roast and ground coffee.

TABLE 1

| | extraction yield | | |
|---|---|---|---|
| | Reference | Sample 1 | Sample 2 |
| 10 g in 100 ml | 15% | 23% | 22% |
| 5 g in 100 ml | 21% | 28% | 26% |

Example 2 Cold Brew Coffee Bags

To prepare the dried roast and ground coffee product, fresh roast and ground coffee beans (mixed with water in a ratio coffee:water of 1:4) were extracted in a coffee extraction cell using water at 20° C. to obtain an extract. The extraction yield was of 14 wt %. The extract was then concentrated by vacuum evaporation to a total solid content of 40 wt %. The concentrated extracted was cooled at 4° C. and was mixed with fresh roast and ground coffee beans that were also cooled at 4° C. in a ratio of 1:1.2 to infuse and/or coat the roast and ground coffee with soluble coffee solids. The mixture was freeze-dried and thereafter milled. The dried roast and ground coffee product was then blended with equal part of fresh roast and ground coffee beans. 7 g of the blend was filled in a paper bag. The bag was steeped in 200 ml of water at room temperature for 5 minutes. The cold brew coffee beverage was highly aromatic.

Example 3 Cold Brew Coffee Capsules

To prepare the dried roast and ground coffee product, fresh roast and ground coffee beans were extracted in a coffee extraction cells using water at 20° C. to obtain an extract. The extraction yield was if 12 wt % using *Arabica* coffee beans. The extract was concentrated to a total solid content of 40% and cooled at 4° C. For infusion and/or coating, the concentrated extract was then mixed with equal parts of fresh roast and ground coffee that was also previously cooled at 4° C. The coated coffee was freeze-dried and thereafter milled to an average particle size of 800 μm.

To prepare a cold brew coffee beverage, 10 g of the product was filled into a coffee machine capsule. When the capsule was used to make a cold brew coffee beverage using 200 ml of water at room temperature, a cold brew coffee beverage was prepared containing 1.5 wt % soluble coffee solids.

Example 4 Cold Brew Milked Coffee Beverage

Cold brew coffee bag according to example 2 containing 7 g of the dried roast and ground coffee product of the present invention was brewed in 200 ml of cold 2% fat milk for 5 minutes.

The invention claimed is:

1. A process for manufacturing a dried roast and ground coffee powder, the process comprising:
    a) extracting roast and ground coffee beans at a temperature below 60° C. to form a coffee extract;
    b) cooling the coffee extract of step a) to a temperature between 10° C. and 4° C. to form a cooled coffee extract;
    c) mixing the cooled coffee extract of step b) with roast and ground coffee that was not extracted in step a) in a ratio of soluble coffee solids to the roast and ground coffee between 1:1 and 1:10, thereby infusing and/or coating roast and ground coffee particles with the soluble coffee solids to form an infused and/or coated roast and ground coffee; and
    d) drying the infused and/or coated roast and ground coffee of step c) to form the dried roast and ground coffee powder.

2. The process according to claim 1, further comprising concentrating the coffee extract from step a) to a total solids content (TC) between 4 wt % and 55 wt % before the cooling in step b).

3. The process according to claim 1, wherein the roast and ground coffee that was not extracted in step a), and which in step c) is mixed with the cooled coffee extract from step b), comprises spent ground coffee.

4. A process for manufacturing a dried roast and ground coffee product, the process comprising:
    mixing roast and ground coffee with water at a temperature below 60° C., in a ratio of roast and ground coffee to water between 1:1 and 1:5, thereby obtaining a slurry;
    extracting roast and ground coffee of the slurry in a vacuum chamber, by applying a pressure between 75 mbar and 400 mbar for between 1 and 12 minutes at a temperature between 10° C. and 35° C.; and
    drying the slurry to form the dried roast and ground coffee product.

5. The process according to claim 4, wherein the ratio of the roast and ground coffee to the water in the mixing of the roast and ground coffee with the water is between 1:1 and 1:3.

6. The process according to claim 4, wherein the drying of the slurry comprises freeze-drying, spray-drying or vacuum belt drying.

7. The process according to claim 1, wherein the drying in step d) comprises freeze-drying, spray-drying or vacuum belt drying.

* * * * *